US006472005B2

(12) United States Patent
Lingk et al.

(10) Patent No.: US 6,472,005 B2
(45) Date of Patent: Oct. 29, 2002

(54) SAVORY SNACK PRODUCT

(75) Inventors: Jochen Lingk, Muehldorf am Inn (DE); Klaus Schneider, Berlin (DE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/828,258

(22) Filed: Apr. 6, 2001

(65) Prior Publication Data

US 2001/0031294 A1 Oct. 18, 2001

(30) Foreign Application Priority Data

Apr. 17, 2000 (EP) ............................................ 00108358

(51) Int. Cl.⁷ ............................................... A21D 13/00
(52) U.S. Cl. ......................... 426/94; 426/275; 426/283; 426/496; 426/549
(58) Field of Search ........................... 426/94, 549, 496, 426/275, 283, 321

(56) References Cited

U.S. PATENT DOCUMENTS

| 4,596,714 | A | * | 6/1986 | Brabbs ......................... 426/94 |
| 4,857,354 | A | * | 8/1989 | Ishida et al. .................. 426/558 |
| 5,573,793 | A | | 11/1996 | Saintain ......................... 426/34 |
| 5,876,781 | A | * | 3/1999 | Lasdon et al. ............... 426/633 |
| 5,935,634 | A | * | 8/1999 | Gamay et al. ............... 426/582 |
| 6,146,672 | A | * | 11/2000 | Gonzalez et al. .............. 426/94 |
| 6,165,522 | A | * | 12/2000 | Lira ............................. 426/94 |
| 6,280,782 | B1 | * | 8/2001 | Hahn et al. .................... 426/94 |

FOREIGN PATENT DOCUMENTS

| EP | 0 826 306 | 3/1998 |
| EP | 0 916 263 | 5/1999 |

\* cited by examiner

*Primary Examiner*—Lien Tran
(74) *Attorney, Agent, or Firm*—Winston & Strawn

(57) ABSTRACT

A savory snack product with two layers of a whipped and baked savory sponge and a filling in-between, with the sponge having an $a_w$ value of between about 0.6 and 0.85, a pH value of between about 3.5 and 5.5 and an overrun of between about 30 and 170%, and the filling being a water-in-oil emulsion that has an $a_w$ value of between about 0.6 and 0.85, a pH of between about 3.5 and 5.5 and an overrun of below about 150%.

18 Claims, No Drawings

SAVORY SNACK PRODUCT

TECHNICAL FIELD

The present invention concerns a savory snack product, which is shelf stable.

BACKGROUND

A shelf stable non-savory snack is already known and launched on the market. This product is made from a sweet biscuit sponge and a sweet cream filling. This snack has a very high amount of sugar and/or other carbohydrates: this addition is necessary to stabilize the snacks by the reduction of the $a_w$ value and keep it moist and elastic in texture. Also, a sandwich type product with a shelf life of six months exists. It is made from crispbread and a savory filling which is practically free of water. The $a_w$ value of the crispbread and the savory fat filling is well below 0.60 and thus the product is very dry and crisp. Other water-in-oil emulsions, like margarine can be stored for several months, but usually under refrigerated conditions and not in combination with a dough.

Thus, there is a need for a savory snack which can be kept at room temperature during at least six months, which has a reduced content of sugar or other carbohydrates and which has a very moist and elastic texture. The present invention satisfies this need.

SUMMARY OF THE INVENTION

The present invention relates to a savory snack product with two layers of a whipped and baked savory sponge and a filling in-between. Advantageously, the sponge has an $a_w$ value of between about 0.6 and 0.85, a pH value of between about 3.5 and 5.5 and an overrun of between about 30 and 170%, and the filling is a water-in-oil emulsion that has an $a_w$ value of between about 0.6 and 0.85, a pH of between about 3.5 and 5.5 and an overrun of below about 150%.

An $a_w$ value of above 0.6 allows to have a snack with a texture giving a good moist feeling, the acidic pH gives a good stability at room temperature with the required time of storage and the whipping of both the filling and the bakery sponge gives a well aerated product.

DESCRIPTION OF THE PREFERRED EMBODIMENTS

The $a_w$ value of the snack can be measured with an Aqua Lab measurement device. The pH is measured with any available pH-meter and the percentage of whipping of both the baked sponge and the filling are measured by density measurements.

In a preferred embodiment of the savory snack according to the invention, the baked sponge has an $a_w$ value of between about 0.7 and 0.8, a pH of between about 4.5 and 5 and an overrun of between about 60 and 120%. Also, the filling has an $a_w$ value of between about 0.7 and 0.8, a pH of between about 4.5 and 5 and an overrun of between about 30 and 70%.

The filling typically has a water content of between about 5 to 20%. Preferably, the water content is between about 10 and 15%. A suitable filling is a water-in-oil emulsion that contains from about 30 to 90% of a vegetable fat. Preferably, the amount of vegetable fat is between about 40 and 60%. All the percentages in the present specification are given in weight and based on the overall composition of the filling.

It is important according to the invention to have a vegetable fat which melts in the mouth by the eating, so that the consumer has a good mouth feeling. Therefore, the fat for the filling preferably has a steep melting curve of between about 25 and 35° C. That means that the whole vegetable fat melts below 35° C. The vegetable fat used is selected from the group consisting of cocoa butter, cocoa butter equivalent, palm oil, hydrogenated vegetable oils, and other vegetable fats.

The filling is prepared from a composition comprising about 5 to 40% maltodextrine or glucose syrup. Preferably, the content of maltodextrine or glucose syrup is between about 20 and 30% of the filling composition. The filling composition further comprises between about 0.2 and 2% of an emulsifier, about 0.2 to 2% of salt and about 1 to 15% of spices and aroma. The emulsifier used is not critical and can be any emulsifier used in the food industry for the preparation of water-in-oil emulsions. Preferably, the emulsifier is mono- and diglycerides of fatty acids or lactic acid esters of mono- and diglycerides. The spices and aroma used are those commonly used in the food industry, such as pepper, onion extract, other vegetable extracts, cheese aroma, other aromas, garlic powder, or other vegetable powders.

The baked sponge has a water content of between about 10 and 25%, based on the overall composition of the baked sponge. The baked sponge is advantageously prepared from a composition comprising up to 40% whole egg, up to 10% glucose syrup and up to 15% glycerine. Preferably, the composition comprises about 10 to 40% liquid egg, about 5 to 10% glucose syrup and about 1 to 5% glycerine. The composition for the preparation of the baked sponge further comprises a sour dough, Pumpernickel, flour, starch, whey protein powder, an emulsifier and potassium sorbate. The amount of these compounds would be the same as those that are normally known and conventionally used in the art, with the Pumpernickel being preferably used in an amount of up to about 20%. Preferably, the sour dough preparation used is normally a sour dough powder used in the food industry, the flour used is wheat flour, and the starch used is wheat starch. Any known emulsifier normally used in the food industry, such as those mentioned above, would be suitable without preference.

In the savory snack according to the invention, the ratio in weight of baked sponge/filling is generally between 20/80 and 80/20 and the skilled artisan can select which relative amounts are optimum for any particular product. The snack is typically packaged in a flow pack, which is made from an aluminum covered propylene sheet or a polypropylene sheet.

The size of the savory snack is not critical. Preferably, the snack is square with a size of around 6 cm by 6 cm and a thickness of around 15 to 20 mm.

The savory snack is preferably prepared according to the following steps.

Preparation of the Baked Sponge

The dry and liquid ingredients are mixed in a mixer. The obtained dough is whipped with a known device to an overrun of between about 30 to 170%. The dough is made in the form of sheets and baked in an oven at about 170 to 260° C. for about 4 to 10 min. The baked sponge is finally cooled in the atmosphere.

Preparation of the Filling

The dry and liquid ingredients of the aqueous phase are mixed, that is the spices, aroma, maltodextrine or glucose syrup with the water. The aqueous phase is then pasteurized and stored in a buffer tank. The emulsifiers and the fats are melted and mixed in another tank and cooled between about 10 and 35° C. Both phases are then mixed, emulsified and whipped to an overrun of below 150%, and preferably about 30 to 70%.

Final Production Steps

The filling is dosed on the sponge layer and a second sponge layer is put on the filling. The obtained product is cooled and the sheet is cut into pieces of squares of around 6 cm and the individual pieces of the savory snack product are fed on a line for producing flow packs.

EXAMPLE

The following description of the specification is illustrated by the following non-limiting example.

A dough is prepared from a composition of 7% flour, 8% corn starch, 8% whey powder, 10% Pumpernickel, 5% glycerine, 9% glucose syrup, 6% fat, 35% whole egg, the remaining being water and other minor ingredients. The dough is whipped to 80% overrun, is made into sheets and baked at 220° C. during 6 min.

The filling is prepared from an aqueous phase comprising 25% maltodextrine, 2% sugar, 5.5% tomato extract, 11% water and minor ingredients like salt, aroma, lactic acid to have 50% of the composition. The other 50% are the fat phase comprising 49.5% of palm oil and an emulsifier. As said above, the fat is melted and mixed with the emulsifier and said fat phase is emulsified with the aqueous phase and whipped to an overrun of 50%.

The dosing of the filling is carried out on a first baked sponge layer and a second sponge layer is disposed on the filling. The product is cooled at a temperature where the fat is solid and cut into square pieces of around 6 cm: the packaging is carried out on a classical flow pack line.

The obtained savory snack has been kept during 6 months at room temperature and retains a good texture, good elasticity and satisfying organoleptic properties.

What is claimed is:

1. A savory snack product comprising two layers of a whipped and baked savory sponge with a filling in-between, the sponge having an $a_w$ value of at least about 0.6 but less than 0.85, a pH value of at least about 3.5 but less than 5.5 and an overrun of between about 30 and 170% and the filling comprising a water-in-oil emulsion that has an $a_w$ value of at least about 0.6 but less than 0.8, a pH of at least about 3.5 but less than 5.5 and an overrun of below about 150%; wherein the product can be stored at room temperature for 6 months while retaining its organoleptic properties.

2. The snack of claim 1, wherein the sponge has an $a_w$ value of between about 0.7 and 0.8, a pH of between about 4.5 and 5 and an overrun of between about 60 and 120%.

3. The snack of claim 1, wherein the filling has an $a_w$ value of between about 0.7 and 0.8, a pH of between about 4.5 and 5 and an overrun of between about 30 and 70%.

4. The snack of claim 1, wherein the filling has a water content of between about 5 and 20%.

5. The snack of claim 1, wherein the filling contains about 30 to 90% vegetable fat having a steep melting curve between about 25 and 35° C.

6. The snack of claim 1, wherein the baked sponge has a water content of between about 10 and 25%.

7. The snack of claim 1, wherein the ratio in weight of baked sponge/filling is between about 20/80 and 80/20.

8. The snack of claim 1, wherein the baked sponge is prepared from a composition comprising whole egg in an amount of up to 40%, glucose syrup in an amount of up to 10% and glycerine in an amount of up to 15%.

9. The snack of claim 1, wherein the filling is prepared from maltodextrine or glucose syrup in an amount of up to 40%.

10. A savory snack product comprising two layers of a whipped and baked savory sponge with a filling in-between, the sponge having an $a_w$ value of at least about 0.6 but less than 0.85, a pH value of at least about 3.5 but less than 5.5 and a overrun of between about 30 and 170% and the filling comprising a water-in-oil emulsion that has an oil content of about 40% to 90%, an $a_w$ value of between at least about 0.6 but less than 0.85, a pH of at least about 3.5 but less than 5 and an overrun of below about 150%; wherein the product can be stored at room temperature for 6 months while retaining its organoleptic properties.

11. The snack of claim 10, wherein the sponge has an $a_w$ value of between about 0.7 and 0.8, a pH of between about 4.5 and 5 and an overrun of between about 60 and 120%.

12. The snack of claim 10, wherein the filling has an $a_w$ value of between about 0.7 and 0.8, a pH of between about 4.5 and 5 and an overrun of between about 30 and 70%.

13. The snack of claim 10, wherein the filling has a water content of between about 5 and 20%.

14. The snack of claim 10, wherein the filling contains 49.5% to 90% vegetable fat having a steep melting curve between about 25% and 35° C.

15. The snack of claim 10, wherein the baked sponge has a water content of between about 10 and 25%.

16. The snack of claim 10, wherein the ratio in weight of baked sponge/filling is between about 20/80 and 80/20.

17. The snack of claim 10, wherein the baked sponge is prepared from a composition comprising whole egg in an amount of up to 40%, glucose syrup in an amount of up to 10% and glycerine in an amount of up to 15%.

18. The snack of claim 10, wherein the filling is prepared from maltodextrine or glucose syrup in an amount of up to 40%.

* * * * *

UNITED STATES PATENT AND TRADEMARK OFFICE
CERTIFICATE OF CORRECTION

PATENT NO. : 6,472,005 B2
DATED : October 29, 2002
INVENTOR(S) : Lingk et al.

It is certified that error appears in the above-identified patent and that said Letters Patent is hereby corrected as shown below:

Column 4,
Line 38, change "between about 25% and 35ºC." to -- between about 25 and 35ºC. --.

Signed and Sealed this

Twenty-fifth Day of February, 2003

JAMES E. ROGAN
*Director of the United States Patent and Trademark Office*